(No Model.)

P. NUNAN.
REFRIGERATIVE VESSEL.

No. 273,137. Patented Feb. 27, 1883.

WITNESSES
Chas. R. Burr
W. E. Bowen.

INVENTOR
Philip Nunan
per O. E. Duffy
Attorney

UNITED STATES PATENT OFFICE.

PHILIP NUNAN, OF SANDUSKY, OHIO.

REFRIGERATIVE VESSEL.

SPECIFICATION forming part of Letters Patent No. 273,137, dated February 27, 1883.

Application filed December 9, 1882. (No model.)

*To all whom it may concern:*

Be it known that I, PHILIP NUNAN, of Sandusky city, in the county of Erie and State of Ohio, have invented certain new and useful Improvements in Refrigerative Vessels; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention has for its object the construction of a useful and convenient refrigerative vessel for preserving perishable substances from deterioration by heat, whether in transit or stationary, and which require refrigerants for their proper preservation, and particularly during shipment.

Heretofore vessels have been made for like purposes as mine with more or less merits. These vessels, however, are complicated in construction, and by reason of such construction are costly and difficult to be kept in a clean and pure condition. I overcome these objections by the production of an effective and economical vessel by which various articles are kept cool or reduced in temperature, and chemical decomposition caused by the presence of effluvia from the articles generally contained in such vessels prevented to a great extent, and the apparatus is so constructed as to be cheap in first cost, easily cleansed, and can be easily repaired from injury, all of which will be hereinafter more fully explained and described, and pointed out in the claims.

Figure 1:
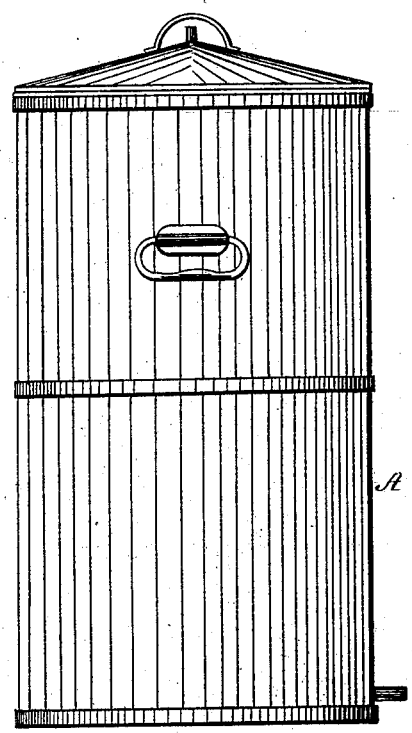
Figure 2:
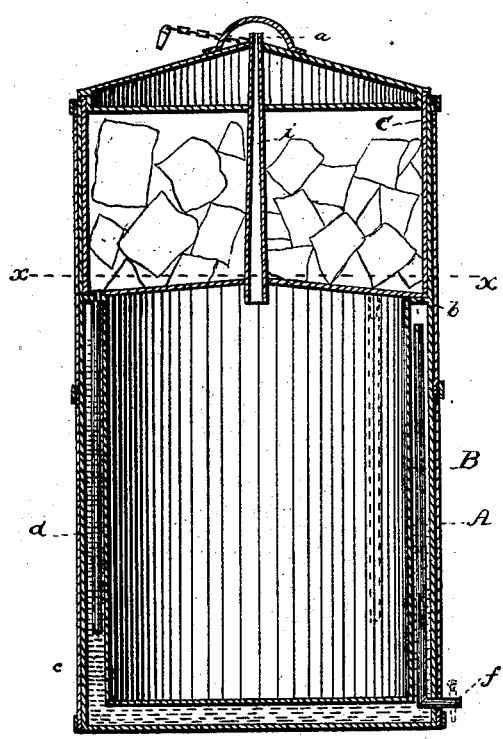
Figure 3:
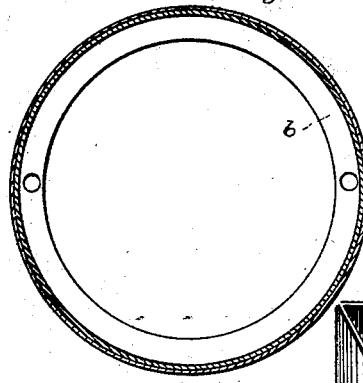
Figure 4:
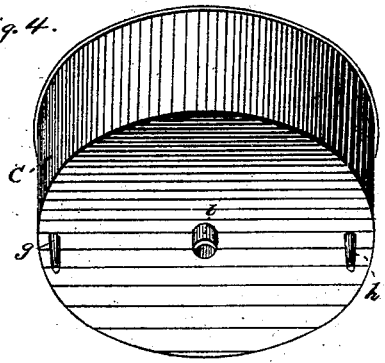
Figure 5:
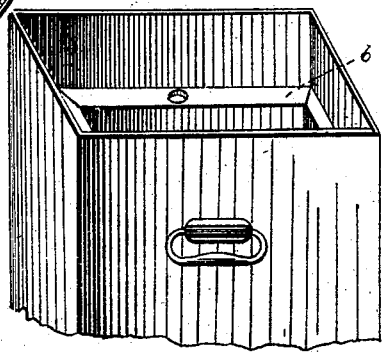

Referring to the drawings, Figure 1 represents an elevation of my improved vessel. Fig. 2 shows a longitudinal vertical section of the same; Fig. 3, a transverse section taken on the line $xx$ of Fig. 2. Fig. 4 shows an inverted view, in perspective, of the ice pan or holder. Fig. 5 shows a square vessel in perspective embodying substantially the same principles of construction as that shown by the cylindrical vessel.

Like letters denote like parts in all the figures.

A is the vessel, which is provided with an outside coating, $a$, of lagging made of wood or other suitable non-conducting material. This coating or casing of lagging may or may not be applied, as the vessel can be advantageously used with or without it. It may be said, however, that in very warm climates, or for effectiveness of preservation, the lagging or coating will be found to be a great advantage, both as protection against the heat and also against abrasion of the outer walls of the vessel.

B shows an inner vessel, smaller in diameter than the outer vessel, A, and is so located within said vessel A as to form an annular space or chamber between the walls of the two vessels. The inner vessel, B, is suspended by means of an annulus, $b$, which is rigidly secured to the inner side of the vessel A at about one-third the distance of the vessel from its top. The said annulus forms the top wall of the chamber $c$, which, as before stated, is formed between the outer and inner vessel, respectively. This annulus $b$ also forms a support or rest for the ice-pan C, which will be described hereinafter. The annulus $b$ is provided with two or more apertures on its face. Fitting to and projecting downwardly therefrom are as many tubes $d$ for the reception and conveyance of the water from the melting ice to near the bottom of the chamber, the object of which will be described farther on. Within the annular chamber $c$, and extending from near its bottom upward to near its top, I locate an exit or overflow pipe, $e$, which is provided with an elbow, $f$, at its lower end, projecting out through the outer wall, and which elbow may be provided with a draw-off plug.

I will now describe more in detail my ice pan or holder C, which is made to fit into the upper portion of the vessel A. By referring to Figs. 2 and 4 it will be observed that the pan is provided with a series of tubes, $g$, $h$, and $i$. The pipe or tube $i$ extends through the ice-pan and lid of the vessel, and forms a communicator between the interior of the inner vessel and the open air, the object being to provide means for the escape of any animal or other deleterious heat or effluvia that may be generated within the vessel, which, if retained, would create decomposition of the contained substances. After the escape of heat, effluvia, &c., I then insert a stopper in the mouth of the escape-tube, when the contents of the can become and retain an even temperature, and to such a degree as to perfectly maintain the contained substance in a perfect state of preservation for many days. The conduit-tubes $g h$ project downwardly a short distance from the bottom of the ice-pan, which bottom is made with a convex upper surface, the object being to more easily shed the water of the melting ice into the conduits *g h*. These conduits or nipples are made slightly tapering for their more ready admission into the conveying-tubes *d*, which carry the escaping cold water to the bottom of the annular chamber surrounding the inner vessel. It will be further observed that the lid of the vessel is made hollow, so that it also has an air-cushion to prevent conduction of heat, the walls of the lid forming a guide for the heat-escape tube *i*. Ice-pans of similar construction may be made to fit the modification shown by Fig. 5, only that in this instance they must be made square or right-angled in configuration. It is evident that oval or other choice shapes may be adopted, if desired, without departing from the spirit of my invention.

The operation of my invention is as follows: The vessel is charged with any substances requiring refrigerants for its preservation in warm weather. The ice-pan is then inserted and filled with ice. The lid is then put on, the stopper of tube *i* being left out if there be animal heat in the contents of the vessel—such contents, for instance, as milk and butter. When the ice commences to melt, the water therefrom escapes through the tubes *g h* into tubes *d* to the annular chamber until it fills to the top of the escape or overflow pipe B. This water, being very cold, cools the contents of the inner vessels to such an extent that they are preserved from decomposition. The object of pipes *d* is to compel the water escaping from the ice to descend to displace the less cold water, which would, if not displaced, remain sluggish, and in time become heated, and in this way defeat the object of the invention. By this means I maintain a constant circulation around the inner vessel from the entering-pipe to the exit-pipe, and thus equalize the temperature throughout the vessel. Other means of circulation may be employed, if desired. When the vessels are to be used in winter-time, the ice is dispensed with and the annular water-chamber becomes a dead-air chamber, which acts equally well in cold freezing weather in preventing the milk or other such substances which require an even temperature from extreme cold. Experience has demonstrated that liquid placed in these vessels and subjected to extreme external freezing temperature was not sensibly affected, and thus it was maintained and preserved from injury.

It is well known that substance, and particularly milk, is much injured by frost in transit. With my invention the contents of the vessel are preserved from extreme temperatures, both from heat and cold, and thus a great saving is the result of its use in transportation. The lagging surrounding the outer vessel, A, is kept in position by metallic bands or hoops, which lagging serves to effectually protect the vessel from indentations and other injuries incident to transportation.

Having thus described my invention, what I claim as new, and desire to secure by Letters Patent, is—

1. A refrigerating-vessel constructed as described, consisting of an outer covered vessel and an inner vessel, said vessels being of varying diameters, forming an intermediate chamber between them, in combination with an ice-holding pan relatively arranged to the said vessels in such manner that the water from the dissolving ice is made to fill the intermediate chamber, as described.

2. The combination, in a refrigerative vessel consisting of the outer covered vessel and the inner vessel, forming the intermediate chamber *c*, of the ice-holder provided with the water-escape tubes and the heat-escape tube, communicating with the inner vessel and outer air, substantially as described.

3. A refrigerative vessel constructed substantially as described, consisting of the inner and outer vessel forming the intermediate chamber, in combination with the ice-holder, the latter having water-escape tubes adapted to fit the circulating-tubes *d*, and operating therewith, as described.

4. A refrigerating-vessel consisting of the vessels A B, forming an intermediate space, and ice-holder C, in combination with the circulating-pipe and discharge-pipe, whereby the cold water is first made to descend and the water of a higher degree of temperature is made to ascend to the escape-pipe, substantially as described.

5. A refrigerating-vessel consisting of the outer and inner chambers, the former having the annulus *b*, from which the inner chamber is suspended, said annulus also serving as a support for the ice-holder, said annulus being provided with apertures for the reception of the escape-nipples of the ice-holder, in combination with the circulating-tube and the escape-tube located within the intermediate chamber, as described.

6. A refrigerating-vessel consisting of two concentric vessels forming an intervening chamber between them, in combination with the ice-holder, the latter being provided with two or more downwardly-projecting water-escape tubes and an upwardly-projecting heated-air-escape tube, the latter being adapted to be closed by a stopper when the required temperature is attained, substantially as set forth and described.

7. A refrigerating-vessel having the annular space between two concentric casings, and a superposed ice-receptacle, provided with water and air escape tubes, in combination with a lid or cover having a dead-air space and a guide-aperture for the guidance of the air-escape tube, substantially as described.

In testimony that I claim the foregoing as my own I hereunto affix my signature in presence of two witnesses.

PHILIP NUNAN.

Witnesses:
B. F. MORSELL,
EDWARD E. ELLIS.